J. W. HOARD.

Toy Money Box.

No. 8,170. Reissued April 9, 1878.

Attest:
Geo. T. Smallwood Jr.
Penn Halsted

Inventor:
John W. Hoard
per John J. Halsted
Atty.

N. PETERS, PHOTO-LITHOGRAPHER, WASHINGTON, D. C.

UNITED STATES PATENT OFFICE.

JOHN W. HOARD, OF PROVIDENCE, RHODE ISLAND.

IMPROVEMENT IN TOY MONEY-BOXES.

Specification forming part of Letters Patent No. 182,826, dated October 3, 1876; Reissue No. 8,170, dated April 9, 1878; application filed February 9, 1878.

*To all whom it may concern:*

Be it known that I, JOHN W. HOARD, of Providence, in the county of Providence and State of Rhode Island, have invented certain new and useful Improvements in Money-Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The object of my invention is to furnish a money-box or savings-bank suitable for children, which may not only be cheaply and easily made, but which also shall be transparent or translucent, so as to indicate approximately the quantity or value of the money contained in it without tempting to the breaking or destruction of the box by the children who usually keep their small savings in this way.

Figure 1:
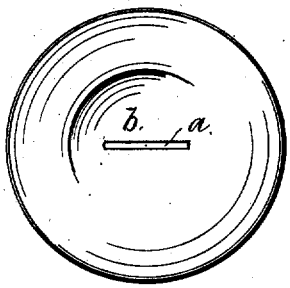
Figure 2:
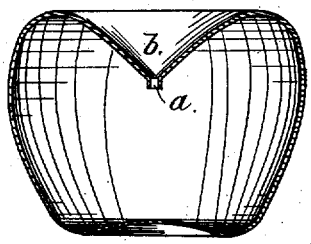
Figure 3:
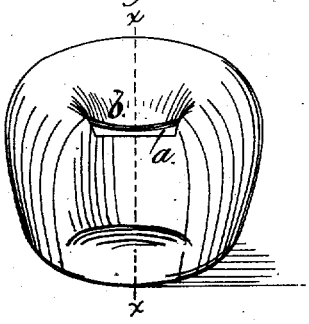
Figure 4:
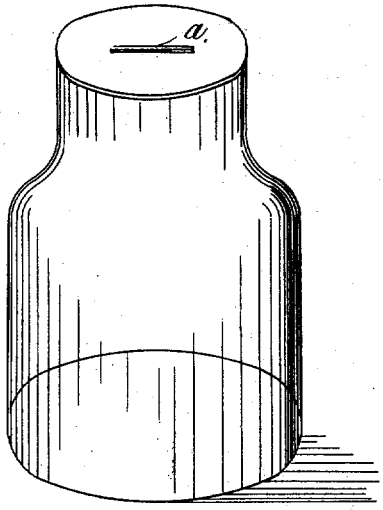

Figures 1, 2, and 3 are respectively a plan, a central vertical section, and a perspective of one form of box made in accordance with my invention, Fig. 2 being taken in the line *x x* of Fig. 3; and Fig. 4 is a perspective view of another form or pattern.

Ordinarily, and in fact almost universally, small money-boxes for children are made of metal or of cheap pottery-ware, and are consequently opaque, besides being clumsy and unattractive; and the latter also need, after being worked into shape after the manner of the potter's art, to be glazed and baked.

By my invention I make them of glass, and preferably by the operation of blowing, or by pressing in a mold, or in any other well-known way of treating molten glass, and by this method I can make them of any desired size or pattern complete, at one operation, requiring no after operation of glazing or baking, the cooling of the blown or molded and shaped glass leaving the box in its ultimate form, and also in its desired state—that is, with the required transparent and translucent character.

I prefer to make that part in which is the slit or mouth *a* (through which the coin or money is dropped into the box) in a sunken or depressed part, *b*, of the box, as this affords an additional safeguard against the accidental or intentional removal of money from the box, for it will be observed that by this construction the coin, upon the box being inverted or shaken in the effort to get it out, tends to slip away from rather than toward the mouth *a*, and with very slight liability of its edge coinciding with and entering the mouth, so as to be dropped out through it.

The importance of encouraging children to save instead of to waste being self-evident, the value of this improved box as compared with those at present in the market is apparent, as, instead of being absolutely sealed, and its contents no longer visible, and therefore affording no charm or attraction, it will be a source of constant entertainment and gratification every time it is handled, and the increase of its treasures will be perceptible and appreciable, not mentally only and by the aid of memory, but to the eye.

I have illustrated only two forms of box; but it will be evident that the general contour or form of the box may be varied as fancy or taste may suggest, so long as it has the essential features above described.

I do not claim a money-box composed in part of glass plates which are held together by a metallic or other frame; but

I claim—

1. A transparent or translucent glass money-box or savings-bank, made integral, and having a slit or slot, *a*, therein, as described and shown.

2. A transparent or translucent money-box having a depressed portion, *b*, and having a slot for the admission of money made in such depressed portion.

JOHN W. HOARD.

Witnesses:
DENNIS LANE,
FRED. R. HOARD.